(12) United States Patent
Yoshimoto et al.

(10) Patent No.: US 9,667,187 B2
(45) Date of Patent: May 30, 2017

(54) MOTOR CONTROL APPARATUS

(71) Applicant: MITSUBISHI ELECTRIC CORPORATION, Chiyoda-ku (JP)

(72) Inventors: Takuji Yoshimoto, Chiyoda-ku (JP); Yoshinori Yamashita, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 323 days.

(21) Appl. No.: 14/374,242

(22) PCT Filed: Jan. 30, 2013

(86) PCT No.: PCT/JP2013/052026
§ 371 (c)(1),
(2) Date: Jul. 24, 2014

(87) PCT Pub. No.: WO2013/115240
PCT Pub. Date: Aug. 8, 2013

(65) Prior Publication Data
US 2015/0028793 A1    Jan. 29, 2015

(30) Foreign Application Priority Data

Jan. 30, 2012   (JP) ................. 2012-017212

(51) Int. Cl.
*H02P 3/18*       (2006.01)
*H02P 23/03*      (2006.01)
(Continued)

(52) U.S. Cl.
CPC .............. *H02P 23/03* (2013.01); *H02P 21/02* (2013.01); *H02P 21/04* (2013.01); *H02P 21/22* (2016.02); *H02P 23/02* (2013.01)

(58) Field of Classification Search
CPC ........ H02P 21/22; H02P 21/06; Y02T 10/643; B60L 2240/423; B60L 2240/421
See application file for complete search history.

(56) References Cited

U.S. PATENT DOCUMENTS 7,411,370 B2    8/2008  Kono
7,723,944 B2    5/2010  Kitanaka et al.
(Continued)

FOREIGN PATENT DOCUMENTS

CN    1993881 A    7/2007
EP    2048772 A1   4/2009
(Continued)

OTHER PUBLICATIONS

International Search Report (PCT/ISA/210) mailed on May 7, 2013, by the Japanese Patent Office as the International Searching Authority for International Application No. PCT/JP2013/052026.
(Continued)

*Primary Examiner* — Shawki S Ismail
*Assistant Examiner* — Zoheb Imtiaz
(74) *Attorney, Agent, or Firm* — Buchanan Ingersoll & Rooney PC

(57) ABSTRACT

A motor control apparatus includes a secondary-magnetic-flux-command calculating unit including a minimum-current-secondary-magnetic-flux-command calculating unit that calculates a secondary magnetic flux command for minimizing a current root-mean-square value due to a torque current and an excitation current and a PWM-signal generating unit that generates a torque current command for outputting a desired torque command and an excitation current command for outputting the secondary magnetic flux command, performs vector control such that a q-axis current, which is a detection value of the torque current, and a d-axis current, which is a detection value of the excitation
(Continued)

current, respectively coincide with the torque current command and the excitation current command, and generates control signals for turning on and off a switching element in an inverter.

8 Claims, 3 Drawing Sheets

(51) Int. Cl.
    *H02P 21/02*     (2006.01)
    *H02P 23/02*     (2006.01)
    *H02P 21/04*     (2006.01)
    *H02P 21/22*     (2016.01)

(56) References Cited

U.S. PATENT DOCUMENTS

| | | |
|---|---|---|
| 8,605,461 B2 | 12/2013 | Hibino |
| 2008/0048607 A1 | 2/2008 | Kono |
| 2010/0087971 A1* | 4/2010 | Yamasaki ............ B60L 15/025 701/19 |
| 2012/0181970 A1* | 7/2012 | Yuuki ................ H02K 1/2766 318/716 |
| 2012/0326646 A1* | 12/2012 | Tanaka ..................... B60L 9/22 318/400.27 |

FOREIGN PATENT DOCUMENTS

| | | |
|---|---|---|
| EP | 2131488 A1 | 12/2009 |
| JP | 61-189193 A | 8/1986 |
| JP | 64-081679 A | 3/1989 |
| JP | 2-032788 A | 2/1990 |
| JP | 3-089884 A | 4/1991 |
| JP | 3-218291 A | 9/1991 |
| JP | 6-087596 A | 3/1994 |
| JP | 9-191700 A | 7/1997 |
| JP | 9-262000 A | 10/1997 |
| JP | 2006-094646 A | 4/2008 |
| JP | 2011-091992 A | 5/2011 |
| WO | WO 2008/004294 A1 | 1/2008 |
| WO | 2011111262 A1 | 9/2011 |

OTHER PUBLICATIONS

Written Opinion (PCT/ISA/237) mailed on May 7, 2013, by the Japanese Patent Office as the International Searching Authority for International Application No. PCT/JP2013/052026.
The extended European Search Report issued on Dec. 21, 2015, by the European Patent Office in corresponding European Application No. 13743139.1. (10 pages).
Office Action issued on Jan. 13, 2016, by the Chinese Patent Office in corresponding Chinese Patent Application No. 201380007352.3 and English translation of the Office Action. (16 pages).

* cited by examiner

MOTOR CONTROL APPARATUS

FIELD

The present invention relates to a motor control apparatus.

BACKGROUND

There has been disclosed a method of analytically deriving a numerical formula representing an excitation current command value for minimizing a total loss that occurs in an induction electric motor (motor) and controlling the induction motor with current control using the derived excitation current command value (e.g., Patent Literature 1).

CITATION LIST

Patent Literature

Patent Literature 1: Japanese Patent Application Laid-Open No. H9-191700 ("0043", Formula (16))

SUMMARY

Technical Problem

However, in the numerical formula derived in Patent Literature 1, a division of square roots and a multiplication and power calculation of a trigonometric function are included in a calculation formula of a square root. Therefore, there is a problem in that control calculation cannot be easily performed.

When a motor control apparatus controls rotational speed of a control target motor, for example, in general, the motor control apparatus performs V/F fixing control for fixing a voltage-frequency ratio from a start to a low-speed region or a medium-speed region. On the other hand, in the conventional technology, arithmetic processing using the numerical formula is performed in all speed regions from a start to a high-speed region. There is a problem in that effective control corresponding to a control form is not always performed.

In the V/F fixing control system, a voltage-frequency ratio corresponding to a rotational speed command for the motor rather than a value corresponding to a load is determined. An output voltage characteristic is given such that an optimum characteristic is obtained at rating time. Therefore, in the low-speed region or a light-load driving region, an excessive voltage is applied to the motor. There is a problem in that a motor loss is larger than an optimum value and highly efficient operation is not always performed.

The present invention has been devised in view of the above and it is an object of the present invention to provide a motor control apparatus that, in particular, reduces a motor loss in a low-speed region or a light-load driving region to enable further improvement of efficiency in a motor control apparatus that uses a V/F fixing control system.

Solution to Problem

In order to solve the aforementioned problems, a motor control apparatus that divides an electric current flowing into and out of a motor driven by an inverter into a torque current and an excitation current and individually controls the torque current and the excitation current, the motor control apparatus is constructed to include: a secondary-magnetic-flux-command calculating unit including a first calculating unit that calculates a minimum current secondary magnetic flux command for minimizing a current root-mean-square value due to the torque current and the excitation current; and a PWM-signal generating unit that generates a torque current command for outputting a torque command and an excitation current command for outputting the secondary magnetic flux command, performs vector control such that a detection value of the torque current and a detection value of the excitation current respectively coincide with the torque current command and the excitation current command, and generates a control signal for turning on and off a switching element included in the inverter.

Advantageous Effects of Invention

According to the present invention, there is an effect that, in particular, a motor loss in a low-speed region or a light-load driving region is further reduced to enable a more highly efficient operation in a motor control apparatus that uses a V/F fixing control system.

DESCRIPTION OF EMBODIMENTS

A motor control apparatus according to embodiments of the present invention is explained with reference to the accompanying drawings. Note that the present invention is not limited by the embodiments explained below.

First Embodiment

Figure 1:
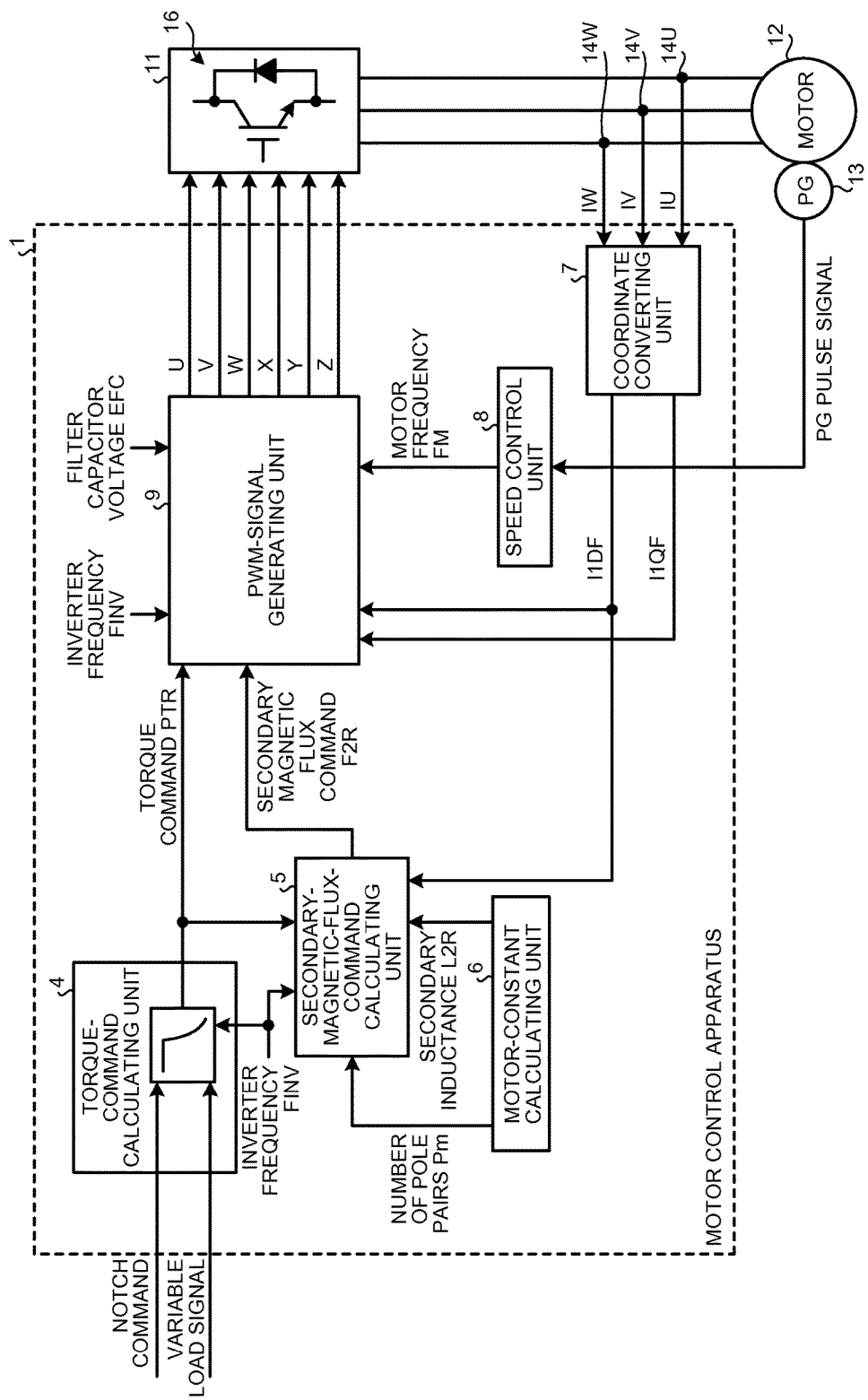
FIG. 1 is a block diagram of a configuration example of a motor control apparatus according to a first embodiment.

FIG. 1 is a block diagram of a configuration example of a motor control apparatus according to a first embodiment. A motor control apparatus 1 according to the first embodiment is a control apparatus by a vector control system that divides an electric current (a primary current) flowing into and out of a motor 12 driven by an inverter 11 into a torque current and an excitation current and individually controls the torque current and the excitation current. As shown in the figure, the motor control apparatus 1 includes a torque-command calculating unit 4, a secondary-magnetic-flux-command calculating unit 5, a motor-constant calculating unit 6, a coordinate converting unit 7, a speed control unit 8, and a PWM-signal generating unit 9 that generates a PWM signal as a voltage command.

A notch command and a variable load signal output from a not-shown external control apparatus, phase (U phase, V phase, and W phase) motor currents IU, IV, and IW detected by current detectors 14 (14U, 14V, and 14W) provided between the inverter 11 and the electric motor (the motor) 12, a PG pulse signal detected by a pulse generator (PG) 13 provided in the motor 12, and the like are input to the motor control apparatus 1. The motor control apparatus 1 generates, on the basis of the notch command, the variable load signal, the motor currents IU, IV, and IW, and the PG pulse signal, PWM signals (U, V, W, X, Y, and Z) serving as voltage commands output from the PWM-signal generating unit 9 located in a last stage for controlling the inverter 11 to be.

The operation of the motor control apparatus 1 according to the first embodiment is explained. First, the notch command and the variable load signal and an internally-generated inverter frequency FINV are input to the torque-command calculating unit 4. The torque-command calculating unit 4 has a pattern of a torque command (a torque pattern) for fixing torque when speed is equal to or lower than a threshold as shown in the figure, and for reducing the torque when the speed exceeds the threshold. The torque-command calculating unit 4 generates a torque command PTR corresponding to the notch command, the variable load signal, and the inverter frequency FINV and outputs the torque command PTR to the secondary-magnetic-flux-command calculating unit 5 and the PWM-signal generating unit 9. Note that the inverter frequency FINV can be an input signal from the outside.

The motor-constant calculating unit 6 calculates a motor constant of the motor 12 represented as an equivalent circuit model. As the motor constant, primary resistance, secondary resistance, primary inductance, secondary inductance, mutual inductance, the number of pole pairs, and the like are representative. In the first embodiment, the motor-constant calculating unit 6 outputs at least values of secondary inductance L2R and the number of pole pairs Pm to the secondary-magnetic-flux-command calculating unit 5. When the motor 12 cannot change the number of pole pairs Pm because of the structure of the motor 12, the number of pole pairs Pm output to the secondary-magnetic-flux-command calculating unit 5 is a fixed value. On the other hand, when the motor 12 can change the number of pole pairs Pm, a value corresponding to a change in the number of pole pairs Pm is output to the secondary-magnetic-flux-command calculating unit 5.

The phase motor currents IU, IV, and IW detected by the current detectors 14 (14U, 14V, and 14W) are input to the coordinate converting unit 7. The coordinate converting unit 7 generates a d-axis current I1DF and a q-axis current I1QF obtained by converting the phase motor currents IU, IV, and IW, which are current detection values of a three-phase coordinate system, into current detection values of a dq-axis coordinate system. Of these electric currents, the d-axis current I1DF is input to both of the PWM-signal generating unit 9 and the secondary-magnetic-flux-command calculating unit 5 and the q-axis current I1QF is input to the PWM-signal generating unit 9. Note that, in FIG. 1, all the phase motor currents IU, IV, and IW are input to the coordinate converting unit 7. However, the d-axis current I1DF and the q-axis current I1QF can be calculated as long as any two kinds of information among the phase motor currents IU, IV, and IW are present.

The inverter frequency FINV, the torque command PTR, the secondary inductance L2R, the number of pole pairs Pm, and the d-axis current I1DF are input to the secondary-magnetic-flux-command calculating unit 5. The secondary-magnetic-flux-command calculating unit 5 generates a secondary magnetic flux command F2R on the basis of the inverter frequency FINV, the torque command PTR, the secondary inductance L2R, the number of pole pairs Pm and the d-axis current I1DF, and outputs the secondary magnetic flux command F2R to the PWM-signal generating unit 9. Note that the internal configuration and a more detailed operation of the secondary-magnetic-flux-command calculating unit 5 are explained below.

The PG pulse signal detected by the pulse generator (PG) 13 is input to the speed control unit 8. The speed control unit 8 generates a motor frequency FM, which is a rotation frequency of the motor 12, on the basis of information such as a cycle of the PG pulse signal and the number of pulses per one cycle included in the PG pulse signal and outputs the motor frequency FM to the PWM-signal generating unit 9.

In this way, the torque command PTR, the secondary magnetic flux command F2R, the d-axis current I1DF, the q-axis current I1QF, and the motor frequency FM are input to the PWM-signal generating unit 9. In addition to these signals (information), the inverter frequency FINV and a filter capacitor voltage EFC, which is a voltage of a not-shown filter capacitor provided on a direct-current section side of the inverter 11, are also input to the PWM-signal generating unit 9. The PWM-signal generating unit 9 internally generates a torque current command for outputting a torque command PTR and an excitation current command for outputting the secondary magnetic flux command F2R. The PWM-signal generating unit 9 performs vector control such that the q-axis current I1QF, which is a detection value of a torque current, and the d-axis current I1DF, which is a detection value of an excitation current, respectively coincide with the torque current command and the excitation current command. The PWM-signal generating unit 9 generates PWM signals U, V, W, X, Y, and Z for controlling a switching element 16 included in the inverter 11 to be turned on and off and outputs those signals to the inverter 11. Note that the PWM signals U, V, W, X, y, and Z are an example obtained when the inverter 11 is a three-phase inverter. Switching signals for switching elements forming an upper arm correspond to U, V, and W. Switching signals for switching elements forming a lower arm correspond to X, Y, and Z.

Figure 2:
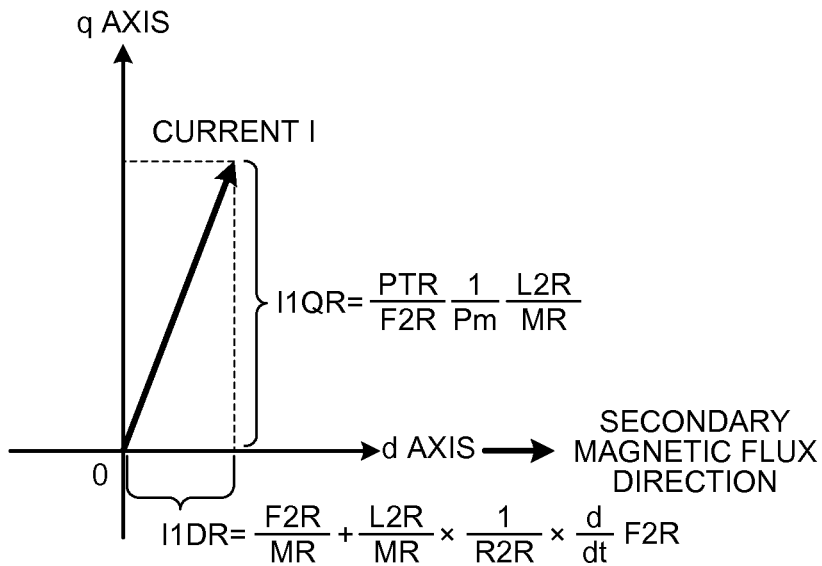
FIG. 2 is a diagram for explaining a relation between a motor constant and d and q axis currents.
Figure 3:
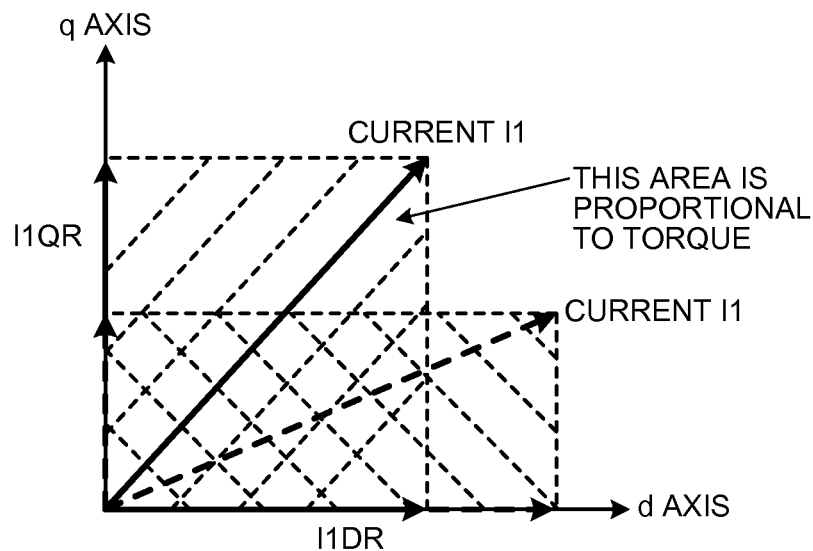
FIG. 3 is a diagram for explaining a relation between d and q axis currents and torque.

An arithmetic formula applied to the motor control apparatus 1 in the first embodiment is explained with reference to FIG. 2 and FIG. 3 and the like. FIG. 2 is a diagram for explaining a relation between a motor constant and d and q axis currents. FIG. 3 is a diagram for explaining a relation between d and q axis currents on a d-q plane and torque.

A torque current command I1QR and an excitation current command I1DR generally used in the control apparatus, which performs the vector control, can be represented as indicated by the following formulas using the torque command PTR, the secondary inductance L2R, the secondary magnetic flux command F2R, the number of pole pairs Pm, a mutual inductance MR, and a secondary resistance R2R as shown in FIG. 2:

$$I1QR = (PTR/F2R) \times (1/Pm) \times (L2R/MR) \quad (1)$$

$$I1DR = (F2R/MR) + (L2R/MR) \times (1/R2R) \times d(F2R)/dt \quad (2)$$

In a V/F fixing control region, the torque command PTR is controlled to a substantially fixed value. Therefore, a second term of Formula (2) representing a temporal change of the secondary magnetic flux command F2R can be put as zero. The secondary magnetic flux command F2R can be represented by the following formula using an excitation current command I1DR:

$$F2R = I1DR \times MR \quad (3)$$

When Formula (3) is substituted in Formula (1), the next formula is obtained:

$$PTR = (Pm/L2R) \times MR^2 \times I1QR \times I1DR \quad (4)$$

Figure 4:
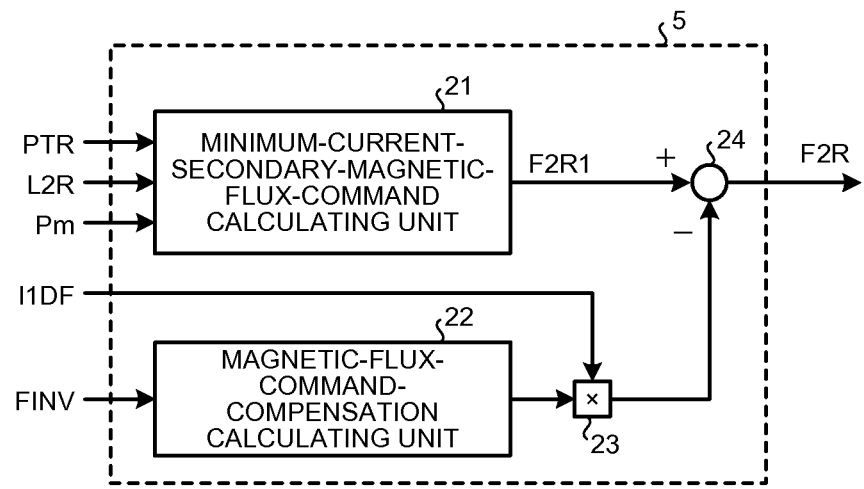
FIG. 4 is a block diagram of a configuration example of a secondary-magnetic-flux-command calculating unit according to the first embodiment.

In Formula (4), because "$(Pm/L2R) \times MR^2$" is a value depending on a motor constant, "$(Pm/L2R) \times MR^2$" can be considered to be a constant. Therefore, the torque command PTR has a magnitude proportional to a product of the torque current command I1QR and the excitation current command I1DR, that is, an area of a portion of a rectangle indicated by hatching in FIG. 3. Therefore, when the torque command PTR is given, it is possible to select I1QR and I1DR having any values satisfying a condition that I1QR×I1DR is fixed (a condition that the area is fixed (i.e., the torque is fixed). On the other hand, a current root-mean-square value $I1 = \sqrt{(I1DR^2 + I1QR^2)/3}$ is minimized when I1QR=I1DR among the I1QR and I1DR having any values, that is, a hatching portion shown in FIG. 4 is a square.

The motor control apparatus according to the first embodiment makes use of the idea explained above. When the condition I1QR=I1DR and the condition of Formula (3) are applied to Formula (4), the excitation current command I1DR can be represented as indicated by the following formula using the torque command PTR.

$$I1DR = \sqrt{\{(L2R/Pm) \times PTR\}}/MR \quad (5)$$

When Formula (5) is substituted in Formula (3), the secondary magnetic flux command F2R is represented as indicated by the following formula.

$$F2R = \sqrt{\{(L2R/Pm) \times PTR\}} \quad (6)$$

According to Formula (6), the secondary magnetic flux command F2R can be calculated according to the torque command PTR, the secondary inductance L2R, and the number of pole pairs Pm. Therefore, the secondary-magnetic-flux-command calculating unit 5 shown in FIG. 1 is configured as shown in FIG. 4. FIG. 4 is a block diagram of a configuration example of the secondary-magnetic-flux-command calculating unit 5 according to the first embodiment. As shown in the figure, the secondary-magnetic-flux-command calculating unit 5 includes a minimum-current-secondary-magnetic-flux-command calculating unit 21 functioning as a first calculating unit, a magnetic-flux-command-compensation calculating unit 22 functioning as a second calculating unit, a multiplier 23, and a subtracter 24.

In the secondary-magnetic-flux-command calculating unit 5, the torque command PTR, the secondary inductance L2R, and the number of pole pairs Pm are input to the minimum-current-secondary-magnetic-flux-command calculating unit 21. The minimum-current-secondary-magnetic-flux-command calculating unit 21 performs arithmetic processing indicated by Formula (6) on the basis of the torque command PTR, the secondary inductance L2R, and the number of pole pairs Pm and outputs a result of the arithmetic processing as a minimum current secondary magnetic flux command F2R1.

When the minimum-current-secondary-magnetic-flux-command calculating unit 21 generates the minimum current secondary magnetic flux command F2R1 in this way, current adjustment of the torque current command I1QR=the excitation current command I1DR is performed. It is possible to minimize an electric current necessary for generating the same torque. A copper loss in the motor 12 depends on the magnitude of an electric current. The loss increases as the electric current increases. Therefore, when the electric current is reduced, the copper loss also decreases. A loss in the switching element 16 of the inverter 11 also depends on the magnitude of the electric current. Therefore, it is possible to reduce the loss in the inverter 11 according to control for minimizing the electric current.

Figure 5:
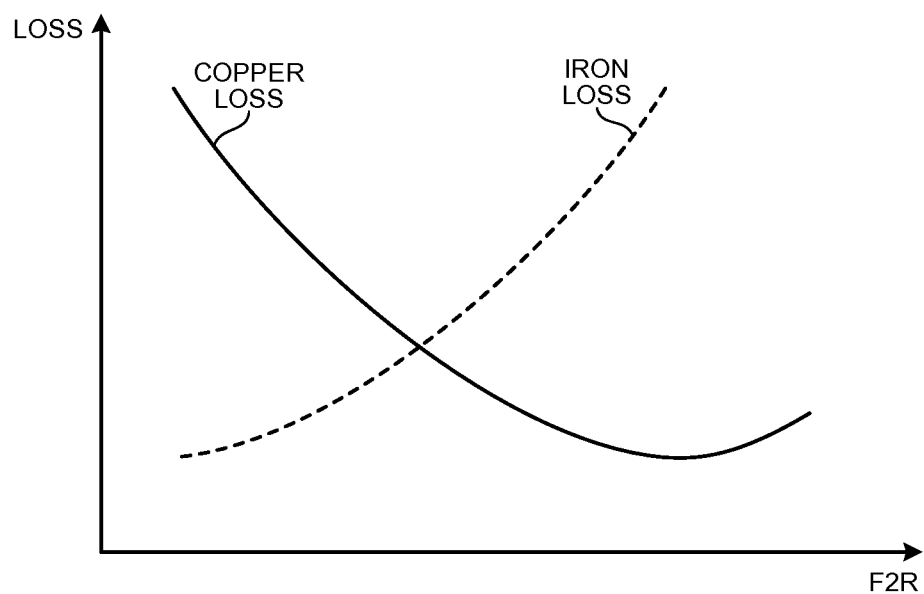
FIG. 5 is a diagram of a loss curve with respect to a secondary magnetic flux command.

Subsequently, a significance of providing the magnetic-flux-command-compensation calculating unit 22 is explained. FIG. 5 is a diagram of a loss curve with respect to the secondary magnetic flux command F2R. In FIG. 5, a solid line represents a copper loss and a broken line represents an iron loss. The copper loss and the iron loss are predominant in a loss that occurs in a motor. Therefore, if a sum of the copper loss and the iron loss can be minimized, it is possible to substantially minimize the motor loss.

However, when the minimum-current-secondary-magnetic-flux-command calculating unit 21 generates the minimum current secondary magnetic flux command F2R1, the current adjustment of I1QR=I1DR is performed as explained above to perform adjustment for minimizing the copper loss. However, the minimum current secondary magnetic flux command F2R1 for minimizing the copper loss is not a magnetic flux condition for a minimum loss when the iron loss is taken into account as well. When the inverter frequency FINV is small and the voltage V applied to the motor is small, the iron loss is small, so that it can be ignored.

On the other hand, when the inverter frequency FINV increases and the voltage V applied to the motor increases, the iron loss is inneglibibly large. In that case, as it is seen from FIG. 5, when the secondary magnetic flux command value F2R is slightly reduced from the minimum current secondary magnetic flux command value F2R1, a decrease of the iron loss is larger than an increase in the copper loss, and the total loss of the copper loss and the iron loss also decreases. That is, the secondary magnetic flux command value F2R for minimizing the total loss of the copper loss and the iron loss becomes smaller than F2R1. Therefore, in the secondary-magnetic-flux-command calculating unit 5 in the first embodiment, as shown in the figure, the magnetic-flux-command-compensation calculating unit 22 for calculating, on the basis of the frequency of the motor, compensation for a decrease from the minimum current secondary magnetic flux command F2R1 of the secondary magnetic flux command value for minimizing the total loss of the copper loss and the iron loss of the motor is provided. An output of the magnetic-flux-command-compensation calculating unit 22 and the d-axis current I1DF are multiplied together in the multiplier 23. A multiplied value obtained by the multiplication is subtracted from an output of the minimum-current-secondary-magnetic-flux-command calculating unit 21.

In the magnetic-flux-command-compensation calculating unit 22, an iron loss consideration table for calculating an iron loss according to a motor characteristic is prepared in advance at its designing stage. The magnetic-flux-command-compensation calculating unit 22 generates, on the basis of the input inverter frequency FINV, an optimum compensation coefficient for reducing a loss due to the iron loss with respect to the d-axis current I1DF and outputs the optimum compensation coefficient to the multiplier 23.

When an output of the multiplier 23 is not zero, a command obtained by subtracting compensation from the minimum current secondary magnetic flux command F2R1 taking into account the iron loss, which is the output of the multiplier 23, is generated as the final secondary magnetic flux command F2R.

Note that, when the output of the multiplier 23 is zero or small compared with the minimum current secondary magnetic flux command F2R1 (e.g., when the d-axis current I1DF is small or when the compensation coefficient output by the magnetic-flux-command-compensation calculating unit 22 is zero or small), the minimum current secondary magnetic flux command F2R1 generated by the minimum-current-secondary-magnetic-flux-command calculating unit 21 is output to the PWM-signal generating unit 9 directly as the secondary magnetic flux command F2R.

As explained above, with the motor control apparatus in the first embodiment, the voltage-frequency ratio is fixed, the secondary magnetic flux command for minimizing the current root-mean-square value due to the torque current and the excitation current in the driving region for driving at fixed torque is calculated, and the vector control is performed such that a detection value of the torque current and the excitation current respectively coincide with the torque current command calculated from the torque command and of the excitation current command calculated from the minimum current secondary magnetic flux. Therefore, it is possible to reduce the motor loss including the copper loss and the iron loss. It is possible to realize the motor control apparatus that enables more highly efficient operation control.

Second Embodiment

In a second embodiment, the switching element 16 included n the inverter 11 is explained. In general, the switching element 16 used in the inverter 11 is a semiconductor switching element made of silicon (Si) (IGBT, MOSFET, etc.; hereinafter abbreviated as "Si-SW"). The technology explained in the first embodiment can be configured using the general Si-SW.

On the other hand, the technology in the first embodiment is not limited to the Si-SW. It is naturally possible to use a semiconductor switching element made of silicon carbide (SiC), which attracts attention in recent years (hereinafter abbreviated as "SiC-SW"), instead of silicon (Si) as the switching element 16.

A loss in the inverter 11 is mainly a switching loss and a conduction loss of the switching element 16. In particular, when the SiC-SW is formed in a MOSFET structure, it is expected that the switching loss can be greatly reduced. When the SiC-WS is formed in the MOSFET structure, a conduction loss of the MOSFET increase in proportion to a square of an electric current. Therefore, it is possible to reduce the conduction loss by reducing a current value flowing to the SiC-SW.

In the motor control apparatus in the first embodiment, it is possible to minimize an electric current for generating the same torque. Therefore, by using the SiC-SW as the switching element 16 included in the inverter 11 in the first embodiment, it is possible to greatly reduce the conduction loss. Consequently, it is possible to reduce the loss in the inverter 11. It is possible to realize the motor control apparatus that enables more highly efficient motor control.

Conventionally, when a large-capacity electric motor of an electric vehicle or the like is driven, an output frequency of the inverter 11 is controlled by sequentially switching a plurality of control modes including a multi-pulse mode and a one-pulse mode. However, in the switching element 16 formed by a wide band gap semiconductor such as SiC, it is possible to perform asynchronous PWM control in all control regions. Therefore, a loss reduction effect by the motor control apparatus in this embodiment extends over all the regions. It is possible to perform highly efficient motor control in all the regions. In particular, when a current value is set high to perform the asynchronous PWM control in all the regions, the loss reduction effect for the motor is extremely large.

Note that, taking notice of a characteristic that a band gap of the SiC is larger than a band gap of Si, the SiC is an example of a semiconductor called wide band gap semiconductor (on the other hand, Si is called narrow band gap semiconductor). Apart from the SiC, for example, a semiconductor formed using a gallium nitride material or diamond also belongs to the wide band gap semiconductor. Characteristics of the gallium nitride material and the diamond have many similarities to the characteristics of the silicon carbide. Therefore, the configuration in which the wide band gap semiconductors other than the silicon carbide are used also constitutes the gist of the present invention.

The switching elements formed by such wide band gap semiconductors have high voltage resistance and high allowable current density. Therefore, it is possible to reduce the size of the switching elements. By using the switching elements reduced in the size, it is possible to reduce the size of the semiconductor module incorporating these elements.

The switching elements formed by the wide band gap semiconductors also have high heat resistance. Therefore, in the case of the switching element that requires a cooling mechanism such as a heat sink, it is possible to reduce the size of the cooling mechanism. It is possible to further reduce the size of the switching element module.

Note that the configurations explained in the first and second embodiments are examples of the configuration of the present invention. It goes without saying that the configurations can be combined with other publicly-known technologies or can be changed to, for example, omit a part of the configurations without departing from the spirit of the present invention.

INDUSTRIAL APPLICABILITY

As explained above, the present invention is useful as a motor control apparatus that can reduce a motor loss in a low-speed region or a low-load driving region.

REFERENCE SIGNS LIST

1 Motor control apparatus
4 Torque-command calculating unit
5 Secondary-magnetic-flux-command calculating unit
6 Motor-constant calculating unit
7 Coordinate converting unit
8 Speed control unit
9 PWM-signal generating unit
11 Inverter
12 Motor
13 Pulse generator (PG)
14 Current detectors
16 Switching element
21 Minimum-current-secondary-magnetic-flux-command calculating unit
22 Magnetic-flux-command-compensation calculating unit
23 Multiplier
24 Subtracter

The invention claimed is:

1. A motor control apparatus that divides an electric current flowing into and out of a motor driven by an inverter into a torque current and an excitation current and individually controls the torque current and the excitation current on the basis of a torque current command obtained from a torque command and an excitation current command, the motor control apparatus comprising:

a secondary-magnetic-flux-command calculating unit including a first calculating unit that calculates a minimum current secondary magnetic flux command from the torque command under a condition that a current root-mean-square value due to the torque current command and the excitation current command is minimized; and a PWM-signal generating unit that generates the torque current command and the excitation current command from the torque command and the minimum current secondary magnetic flux command, performs vector control such that a detection value of the torque current and a detection value of the excitation current respectively coincide with the torque current command and the excitation current command, and generates a control signal for turning on and off a switching element included in the inverter.

2. The motor control apparatus according to claim 1, wherein the first calculating unit calculates the minimum current secondary magnetic flux command on the basis of secondary inductance and a number of pose pairs of the motor and the torque command.

3. The motor control apparatus according to claim 1, wherein the switching element is formed of a wide band gap semiconductor.

4. The motor control apparatus according to claim 3, wherein the wide band gap semiconductor is a semiconductor in which silicon carbide, a gallium nitride material, or diamond is used.

5. A motor control apparatus that divides an electric current flowing into and out of a motor driven by an inverter into a torque current and an excitation current and individually controls the torque current and the excitation current on the basis of a torque current command obtained from a torque command and an excitation current command, the motor control apparatus comprising:

a secondary-magnetic-flux-command calculating unit including a first calculating unit that calculates a minimum current secondary magnetic flux command from the torque command under a condition that a current root-mean-square value due to the torque current command and the excitation current command is minimized, the secondary-magnetic-flux-command calculating unit calculating, on the basis of an inverter frequency and the minimum current secondary magnetic flux command, a secondary magnetic flux command with which a total loss of a copper loss and an iron loss of the motor decreases to be smaller than the total loss that occurs when the minimum current secondary magnetic flux command is used; and a PWM-signal generating unit that generates the torque current command and the excitation current command from the torque command and the secondary magnetic flux command, performs vector control such that a detection value of the torque current and a detection value of the excitation current respectively coincide with the torque current command and the excitation current command, and generates a control signal for turning on and off a switching element included in the inverter.

6. The motor control apparatus according to claim 5, wherein the secondary-magnetic-flux-command calculating unit generates compensation for reducing a loss due to the iron loss on the basis of the inverter frequency and subtracts the compensation from the minimum current secondary magnetic flux command to calculate the secondary magnetic flux command.

7. The motor control apparatus according to claim 5, wherein the first calculating unit calculates the minimum current secondary magnetic flux command on the basis of secondary inductance and a number of pole pairs of the motor and the torque command.

8. The motor control apparatus according to claim 5, wherein the switching element is formed of a wide band gap semiconductor.

* * * * *